United States Patent Office 3,491,636
Patented Jan. 27, 1970

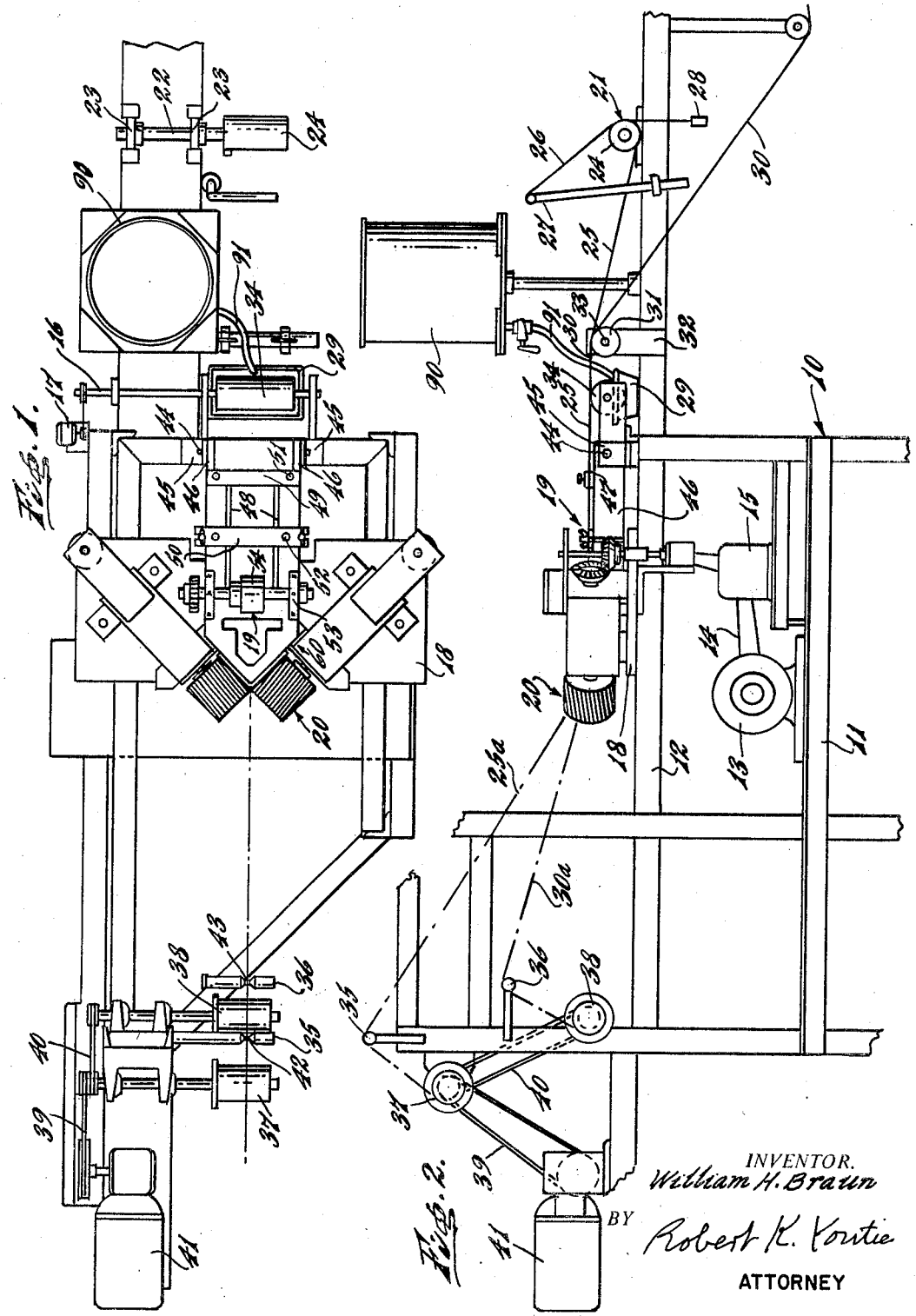

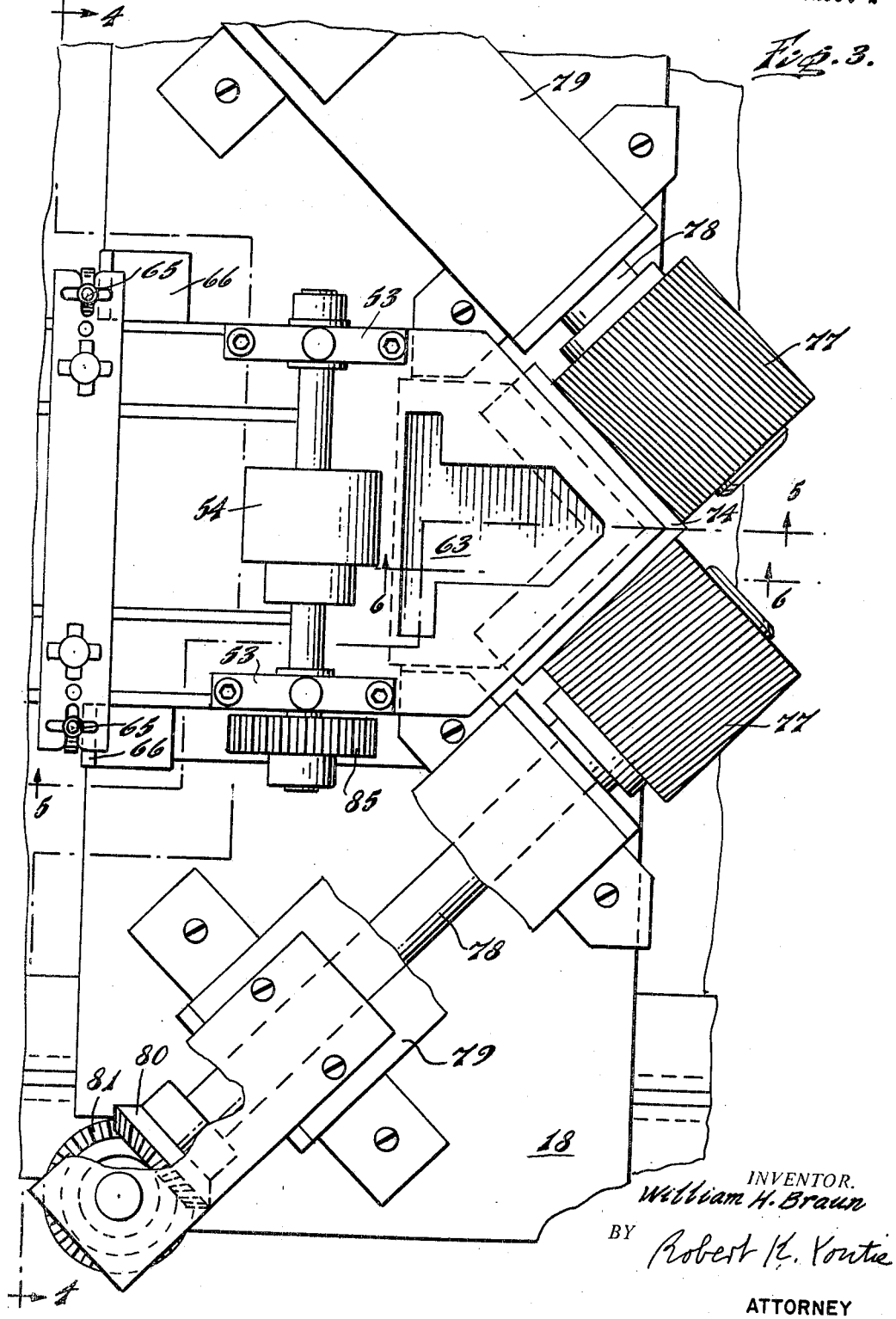

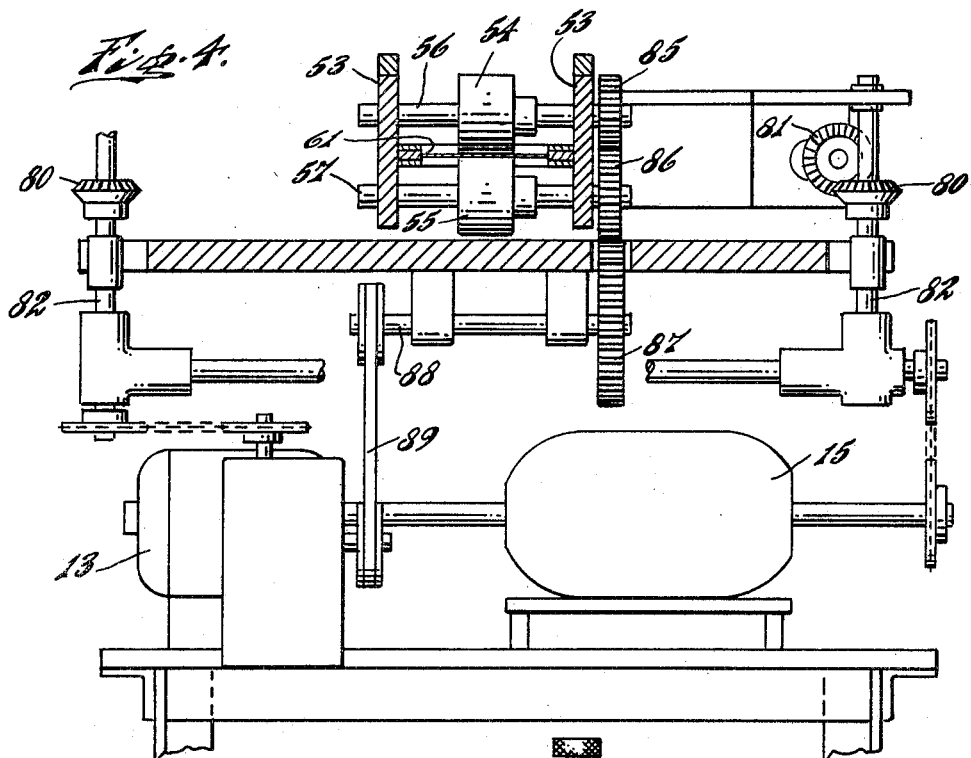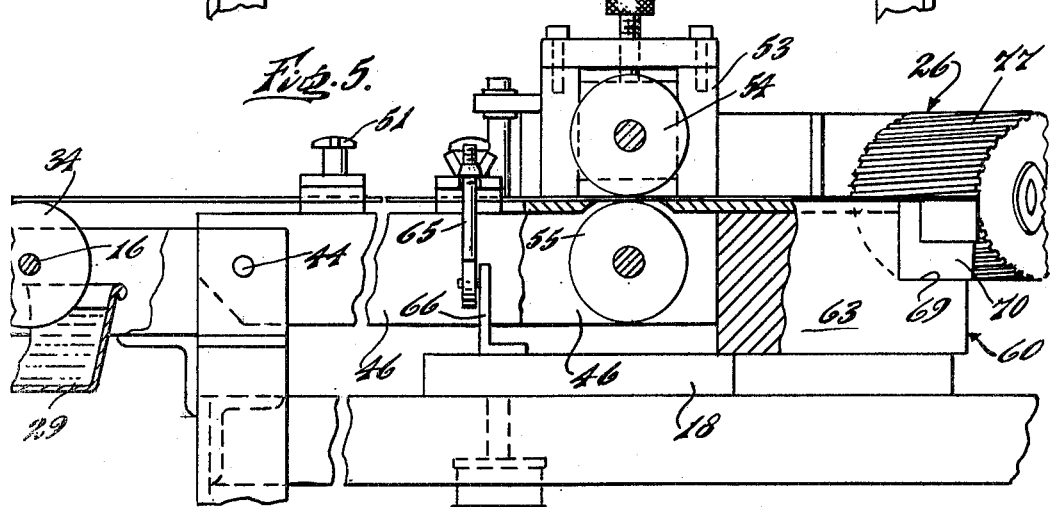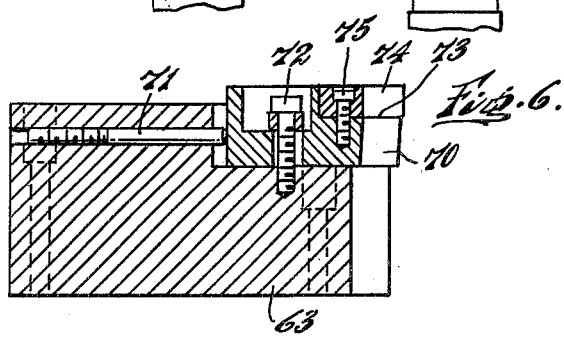

3,491,636
APPARATUS FOR CUTTING STRIP MATERIAL
William H. Braun, Elkins Park, Pa., assignor to Carey-McFall Company, Philadelphia, Pa., a corporation of Pennsylvania
Filed Mar. 15, 1968, Ser. No. 713,522
Int. Cl. B26d 1/36
U.S. Cl. 83—162                                               7 Claims

ABSTRACT OF THE DISCLOSURE

This invention is concerned essentially with cutting apparatus for strip material wherein the material passed over angularly disposed fixed cutting edges and cutters are rotated in cutting relation with the fixed edges to effect cutting of the material.

BACKGROUND OF THE INVENTION

While the apparatus of the present invention has been primarily developed and employed for the cutting of strip material for use in artificial Christmas trees, and the like, it is appreciated that the instant apparatus may be employed in many diversified strip-cutting operations, all of which are intended to be comprehended herein.

In prior devices adapted for this purpose, such devices commonly being called fringing machines, the use of reciprocating cutters or cutting heads has not been found satisfactory, as tending to chatter, causing excessive vibration and wear, and frequent malfunction. Hence, commercially practical prior fringing devices have heretofore employed reciprocatory cutting mechanisms having serious speed limitations. Also, prior devices employing rotary severance by pressure have not been found satisfactory, especially with heavier materials.

SUMMARY

Accordingly, it is an important object of the present invention to provide a highly improved strip-cutting apparatus of the type described which greatly increases the productive capacity per unit of cost and space, is extremely durable and reliable throughout a long useful life, and which is relatively simple in structure for manufacture and maintenance at a reasonable cost.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

BRIEF DESCRIPTION OF THE DRAWING

FIGURE 1 is a top plan view showing a strip-cutting apparatus constructed in accordance with the teachings of the present invention.

FIGURE 2 is a side elevational view of the apparatus of FIGURE 1.

FIGURE 3 is a partial top plan view of the apparatus of FIGURE 1, enlarged for clarity.

FIGURE 4 is a transverse sectional elevational view taken generally along the line 4—4 of FIGURE 3.

FIGURE 5 is a partial longitudinal sectional view taken generally along the line 5—5 of FIGURE 3.

FIGURE 6 is a partial longitudinal sectional view taken generally along the line 6—6 of FIGURE 3.

DESCRIPTION OF THE PREFERRED EMBODIMENT

Referring now more particularly to the drawing, and specifically to FIGURES 1 and 2 thereof, a supporting framework is generally designated 10, adapted to rest on a suitable floor or ground surface (not shown), including an intermediate support level of framework 11, and an upper support level of framework 12.

Carried on the intermediate support level 11 may be suitable drive means, such as a motor 13 connected in driving relation, as by suitable transmission means 14, to a speed reducer 15.

On the upper support level 12 there is fixed a laterally extending, generally horizontal support plate 18 which carries a feeding assembly generally designated 19, and a cutting mechanism, generally designated 20.

Upstream of the feeding assembly 19, rightward as seen FIGURES 1 and 2, the upper support 12 may include one or more strip supplies, generally designated 21. In the illustrated embodiment only a single strip supply 21 is shown, but it is appreciated that plural strip supplies may be employed, for simultaneous feeding and cutting thereof. The strip supply 21 includes a rotary shaft or spool 22 journaled in suitable bearings 23 and carrying a roll or coil of strip material 24. In FIGURE 2 the strip material is seen as extending forwardly at 25 from the roll 24. To prevent undesired unwinding of the freely rotatable strip roll 24, a retarding member or flexible line 26 may be suspended from a bracket 27 over the roll 24, carrying on its lower end a weight 28, thereby applying a frictional retarding force to unwinding of the roll. Upstream of the supply roll 24 may be an additional supply roll (not shown), which supplies a strip 30. The strips 25 and 30 may merge and pass together over an idler roll 31 freely rotatably supported on a suitable pedestal journal 32 carried by the upper framework support 12. Suitable guide means or pins 33 may upstand from the spool of roll 31 to laterally constrain the strips 25 and 30 to a desired path of movement. Just downstream of the idler roll 31 may be an additional roll 34 rotatably carried in a pan 29 on the upper framework 12 and supporting the upper and lower strips 25 and 30. The pan 29 contains liquid lubricant for transfer to the strip and may be supplied from a reservoir 90 through a conduit 91. The roll 34 may be driven, as through a transmission 16 from a drive motor 17 to assure proper lubrication. From the roller 34, the strips 25 and 30 pass to the feeding mechanism 19 and cutting mechanism 20.

Upon exit from the cutting mechanism 20, the cut or fringed strips are respectively designated 25a and 30a, corresponding to uncut strips 25 and 30. The upper strip 25a may pass over an upper tracking member 35, and the lower cut or fringed strip 30a may pass over a lower tracking member 36, being respectively wound on take-up or receiving rolls 37 and 38 carried by suitable journal means on the framework 12. That is, the take-up rolls 37 and 38 may constitute a receiving means for receiving the cut or fringed strip material, being suitably driven, as by belt-and-pulley means 39 and 40, or other suitable means, as from a drive motor 41.

As best seen in FIGURE 1, the upper and lower tracking members 35 and 36 each constitute a generally horizontal shaft or rod extending transversely of the path of strip movement, and respectively formed with peripherally extending generally V-shaped notches 42 and 43. The notches 42 and 43 are each advantageously of a truncated V-shaped configuration, having a generally flat circumferentially extending or cylindrical bottom wall joining together the conical, spaced side walls of the respective notch. The tracking members 35 and 36 may be freely rotatable, or may be stationary, if desired, the latter being preferred for its simplicity.

Referring again to the strip-feeding unit 19, just downstream of the support roll 34 a pair of laterally spaced upstanding brackets 45 are fixed by welding or otherwise to the upper framework 12. A pair of laterally spaced generally horizontal side rails 46 extend respectively from brackets 45 downstream over the mounting plate 18. The sidepieces or rails are pivoted to the brackets 45 as by a laterally extending pin 44. A longitudinally extending strip-supporting plate 47 rests on the sidepieces 46, bridging the space therebetween and is preferably fixed to the sidepieces by any suitable means so that the plate and sidepieces are swingable together about pin 44. A pair of laterally spaced barlike guide members 48 extend in parallelism with each other resting longitudinally on the support plate 47; and, a pair of transversely extending clamping bridges 49 and 50 are arranged in parallelism with each other across the guide members 48. The guide members 48 are laterally adjustable to constrain a strip of material being cut to longitudinal movement therebetween, and are adapted to be rigidly clamped in position by the clamping members 49 and 50, each being provided with suitable releasable fasteners, as at 51 and 52.

At the forward ends of the sidepieces 46 are a pair of laterally spaced journal bearings 53 carrying upper and lower, generally tangential feed wheels 54 and 55 on respective vertically spaced laterally extending, generally horizontal shafts 56 and 57. The bearing supports or posts 53 may be anchored to the sidepieces 46 and plate 47 for swinging movement therewith.

A rigid anvil assembly 60 is fixed on the baseplate 18 in position to support the forward end of the support plate in generally horizontal position. Additionally, a pair of hold-down fasteners or tie bolts 65 are pivotally anchored to the baseplate 18 as by brackets 66 adjacent to opposite ends of the clamp bar 50 for releasable securement thereto. In this manner, the sidepieces 46, strip-supporting plate 47, bearing supports 53 and anvil 60 are all rigidly fixed in position. The strip-supporting plate 47 extends forwardly or downstream beyond the feed rolls 54 and 55, being open to receive the latter as at 61, and partially overlies the anvil assembly 60, being securely clamped thereon, as mentioned above.

The anvil assembly 60 includes a lower block 63 which is fixedly secured to the baseplate 18. As seen in plan the anvil block 63 is convergent in the downstream direction, its convergent sides defining therebetween an angle of 90 degrees in the illustrated embodiment. However, the angle of convergence of the anvil block 63 may vary, as desired. The upper surface of the anvil block 63, along the convergent sides, is recessed, as at 69. Provided in the recess 69 is a generally V-shaped edge mounting block 70, which may have suitable position-adjustment means, such as a setscrew 71, see FIGURE 6, threaded in the anvil 63 and engageable with the edge mounting block 70. In order to lock the edge mounting block 70 in a desired position of adjustment, suitable locking means may be provided, such as a screw-in-slot construction 72. The edge mounting block 70 is provided on its upper side, along its downstream convergent edges with a recess 73 receiving a V-shaped edge piece or cutter 74 which is detachably and replaceably secured therein by suitable means, such as screw 75.

In addition to the anvil 60, the cutting mechanism 20 includes a pair of angularly disposed rotary cutters or cutting wheels 77 each disposed with its axis generally parallel to a respective convergent edge of the fixed edge pieces 74 for cutting cooperation therewith upon rotation of the cutters 77. The cutter wheels 77 are generally in the nature of milling cutters and respectively carried on horizontal, angularly disposed shafts 78 which are journaled in pedestal bearings 79 mounted on the baseplate 18.

As seen in FIGURE 3, the cutter wheels rotate downwardly into cutting coaction with the edge piece 74, the rotating blades of the cutters 77 cooperating with the fixed anvil edge 74 to cut the strip material passing therebetween. The blades of the cutters 77 are preferably of spiral configuration and of proper hand so as to progressively engage in cutting coaction with the anvil piece 74 in the direction of strip-material movement. Further, the configuration of blades of cutters 77 is such that adjacent blades angularly overlap each other for continuous cutting action of the blades. However, under certain conditions, the cutter blades need not overlap, but may be circumferentially spaced, as when cutting relatively high-impact-resistant material. This permits of greater range of adjustment between cuts by varying the speed of strip feed. If desired, the helix angle may vary to zero, so that the blades are substantially straight.

It will also be seen in FIGURE 3 that the angularly disposed cutters 77 terminate short of each other, so that strip material passing over the apex of the V-shaped anvil piece 74 remains uncut, passing between the cutter wheels. By this arrangement, with strip material of a width to be guided in its longitudinal path between bars 48, only the longitudinal centerline region of the strip material remains uncut, the remainder being repeatedly severed to the longitudinal side edges thereof, so that the material is effectively fringed along its longitudinal margins. Of course, the strip material may be guided off-center so that its uncut region or web is located closer to one side edge than the other, or along one side edge.

The shafts 78 and their carried cutter wheels 77 may be driven by any suitable means, such as by bevel gears 80 and 81 connected through suitable shafting, as at 82 and other suitable transmission means to the speed reducer 15.

Also, the tangential feed rolls 54 and 55, through the nip of which is fed the strip material to be cut, may be suitably driven in any desired manner, as by meshing gears 85 and 86 keyed to respective shafts 56 and 57, the latter gear further meshing with a drive gear 87 driven through suitable transmission means, such as a shaft 88 and belt 89 from the drive member 13. Of course, the strip-feed mechanism 19 and cutting mechanism 20 are properly synchronized for the desired cutting action, and may be adjusted to achieve variations in speed of operation as well as cutting action, say to increase or decrease the spacing between cuts.

As mentioned hereinbefore, the cut or fringed strip material 25a and 30a passes from the cutting mechanism 20 to the take-up or receiving rolls 37 and 38, being accurately guided thereto by the tracking means 35 and 36. Of course, the apparatus of the instant invention may be employed to cut or fringe a single strip at a time, if desired; and, the use of the plural strip-supply and take-up means may be employed to alternately feed one roll after another without shutting down the machine or stopping the cutting operation. The use of lubricant in pan 29 applied to the strip material has been found to prolong the life of the cutting edges. However, lubricant may be applied otherwise, as from a tank 90 and suitable spray means (not shown) for applying lubricant from the tank directly to the strip material being cut.

From the foregoing, it is seen that the present invention provides a strip-cutting apparatus which fully accomplishes its intended objects and is well adapted to meet practical conditions of manufacture and use.

Although the present invention has been described in some detail by way of illustration and example for purposes of clarity of understanding, it is understood that certain changes and modifications may be made within the spirit of the invention and scope of the appended claims.

What is claimed is:

1. Apparatus for transversely cutting elongate strip material, said apparatus comprising a fixed anvil having a pair of angularly disposed cutting edges, supply means for supplying strip material for movement across said anvil edges, a pair of spaced rotary cutters each located for rotation in cutting cooperation with respective anvil edges, a strip crossing said anvil being repeatedly severed by said cutters and leaving an unsevered portion passing between said cutters, and receiving means for receiving said strip after cutting.

2. Apparatus according to claim 1, said anvil cutting edges being generally coplanar and convergent downstream of strip movement, and said cutters being downstream of said anvil.

3. Apparatus according to claim 2, said rotary cutters each comprising a plurality of generally helical blades and being disposed parallel to respective anvil edges.

4. Apparatus according to claim 3, said blades extending helically in the angular direction for progressive cutting cooperation with said anvil edges in the direction of strip movement.

5. Apparatus according to claim 2, in combination with guideways upstream of said anvil for guiding said strip material toward said anvil, and feeding means for feeding said strip material along said guideways.

6. Apparatus according to claim 2, said rotary cutters extending laterally beyond said strip, whereby said cutting effects fringing of the longitudinal strip margins.

7. Apparatus according to claim 6, in combination with a tracking member along the path of strip movement between said cutters and receiving means, said tracking member having a notch, and said strip being engageable with said tracking member upon strip movement to said receiving means with said unsevered strip portion in said notch.

References Cited

FOREIGN PATENTS 912,975  6/1954  Germany.

JAMES M. MEISTER, Primary Examiner

U.S. Cl. X.R.

83—303, 342, 349, 355; 242—56